United States Patent Office 3,845,077
Patented Oct. 29, 1974

3,845,077
PROCESS FOR THE MANUFACTURE OF TRIARYLCARBINOL LACTONES
Nigel Hughes, Manchester, England, assignor to Imperial Chemical Industries Limited, London, England
No Drawing. Filed July 29, 1971, Ser. No. 167,440
Claims priority, application Great Britain, July 23, 1971, 41,606/71
Int. Cl. C07d 5/38
U.S. Cl. 260—343.4                        4 Claims

ABSTRACT OF THE DISCLOSURE

A process for the manufacture of a triarycarbinol having the general formula:

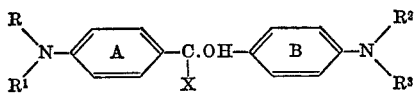

wherein R and $R^2$ each independently represents an optionally substituted alkyl radical, $R^1$ and $R^3$ each independently represents an optionally substituted alkyl or aryl radical, X represents an optionally substituted aryl radical and rings A and B may be further substituted, or a lactone of said triarylcarbinol, which process comprises oxidising the corresponding leuco compound with an organic or inorganic persulphate.

---

This invention relates to a chemical process and more particularly to a process for the manufacture of triarylcarbinols.

According to the invention there is provided a process for the manufacture of a triarylcarbinol having the general formula:

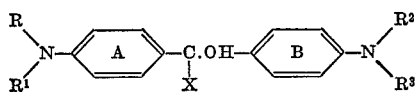

wherein R and $R^2$ each independently represents an optionally substituted alkyl radical, $R^1$ and $R^3$ each independently represents an optionally substituted alkyl or aryl radical, X represents an optionally substituted aryl radical and rings A and B may be further substituted, or a lactone of said triarylcarbinol, which process comprises oxidising the corresponding leuco compound with an organic or inorganic persulphate.

The substituents R, $R^1$, $R^2$ and $R^3$ are most preferably methyl or ethyl radicals. Other substituents which may be present in rings A and B include alkyl, alkoxy and halogen but it is preferred that said rings are unsubstituted.

Other substituents which may be present on the aryl radical represented by X include groups of the formula: —$NR^4R^5$ wherein $R^4$ is optionally substituted alkyl or aryl and $R^5$ is hydrogen or optionally substituted alkyl. Preferably X is a 4-dimethylaminophenyl radical which may carry further substituents.

It will be understood by those skilled in the art that the corresponding leuco compound referred to above is a compound of the formula:

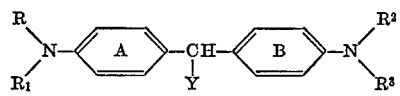

wherein R, $R^1$, $R^2$, $R^3$ and rings A and B have the significances stated above, and Y is an optionally substituted aryl radical.

Y will normally be identical with X except when the product is a lactone of a triarylcarbinol. Lactones are formed when the aryl radical represented by Y carries a carboxy group in the ortho position with respect to the carbinol carbon atom. In addition to the carboxy group, the aryl radical Y may carry a group of the formula —$NR^4R^5$ as defined above. Thus the process of the invention may be used for the preparation of 3,3-bis(4-dimethylaminophenyl)-6-dimethylaminophthalide commonly known as Crystal Violet Lactone. This compound has the formula:

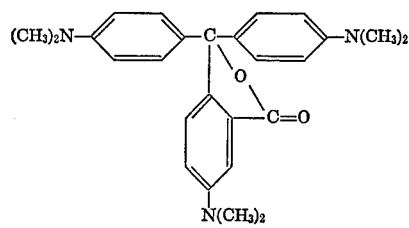

and may be prepared by the oxidation of 2[4,4'-bis(dimethylamino)benzhydryl]-5-dimethylaminobenzoic acid.

Persulphates which may be used in the process of the invention include ammonium persulphate, sodium persulphate, potassium persulphate and methylammonium persulphate.

Suitable amounts of persulphate to use are usually in the range of from 1.0 to 1.5 molar equivalents based on the leuco compound. The reaction may conveniently be carried out at temperatures between 20° C. and 100° C. The process of the invention provides excellent yields of product and in the case of alkalisoluble leuco compounds, for example Leuco Crystal Violet Lactone, higher yields of purer products are obtained than when using previously described processes which use other oxidising agents.

The invention is illustrated but not limited by the following Examples in which all parts are by weight:

EXAMPLE 1

20.85 Parts of 2[4,4'-bis(dimethylamino)benzhydryl]-5-dimethylaminobenzoic acid are dissolved in a solution of sodium hydroxide (6 parts) in water (250 parts). The solution is heated to 65° C. and a solution of potassium persulphate (15 parts) in water (100 parts) is added over 15 minutes with stirring. After stirring a further 15 minutes the precipitated product is collected by filtration, washed with water and dried in air at 50° C.

18.75 parts of 3,3-bis(4-dimethylaminophenyl)-6-dimethylaminophthalide are thus obtained.

In place of 15 parts of potassium persulphate there may be used 12.5 parts of sodium persulphate or 12.0 parts of ammonium persulphate.

EXAMPLE 2

19.9 parts of 2[4,4'-bis(dimethylamino)benzhydryl] benzoic acid are dissolved in a solution of sodium hydroxide (6 parts) in water (250 parts). The solution is heated to 85±2° C. and a solution of potassium persulphate (16.5 parts) in water (125 parts) is added over 1 hour with stirring. After stirring a further 2 hours at 85° C. the precipitated product is collected by filtration, washed with water and dried in air at 50° C.

After recrystallisation from n-Propanol 14.3 parts of 3,3-bis(4-dimethylaminophenyl)-phthalide are obtained.

Similarly the leuca compounds of column A of the following table may be oxidised to the phthalides given in column C by the persulphate(s) given in column B. The yield of pure product is given in column D.

| Example | A | B | C | D |
|---|---|---|---|---|
| 3 | 2-[4,4'-bis(diethylamino) benzhydryl]-5-diethylaminobenzoic acid. | Ammonium persulphate. | 3,3-bis(4-diethylaminophenyl)-6-diethylaminophthalide. | 20.4 parts. |
| 4 | 2-[4,4'-bis(dimethylamino)-2,2'-dichlorobenzhydryl]-5-dimethylaminobenzoic acid. | ___do___ | 3,3-bis[2-chloro-4-(dimethylamino)-phenyl]-6-dimethylaminophthalide. | 12.6 parts. |
| 5 | 2-[4,4'-bis(dimethylamino)-2,2'-dimethylbenzhydryl]-5-dimethylaminobenzoic acid. | Potassium persulphate. | 3,3-bis[2-methyl-4-(dimethylamino)-phenyl]-6-dimethylaminophthalide. | 13.35 parts. |

I claim:
1. A process for the manufacture of a triarylcarbinol lactone having the formula:

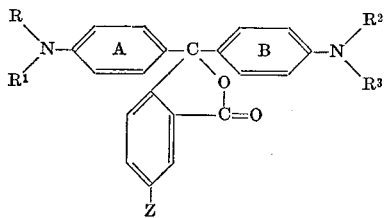

wherein R, R¹, R² and R³ each independently represents methyl or ethyl, Z represents hydrogen, dimethylamino or diethylamino and rings A and B may optionally be substituted by halogen or lower alkyl, said process comprising the step of oxidising a leuco compound having the formula:

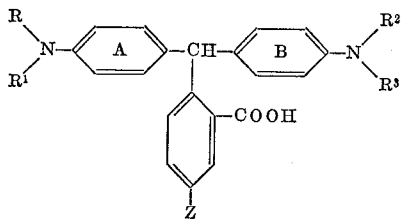

with an inorganic persulphate selected from the group consisting of ammonia persulphate, sodium persulphate, potassium persulphate and methylammonium persulphate.

2. A process as claimed in claim 1 wherein the leuco compound has the formula:

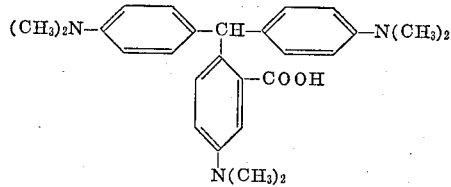

3. A process as claimed in claim 1 wherein the persulphate is used in an amount of from 1.0 to 1.5 molar equivalents based on the leuco compound.

4. A process as claimed in claim 3 wherein the leuco compound is dissolved in a solution of sodium hydroxide in water.

References Cited
UNITED STATES PATENTS
2,742,483    4/1956    Crouse _____ 260—343.4

OTHER REFERENCES
Chemical Abstracts, vol. 41, 1947, 4027b relied on.
Chemical Abstracts, vol. 49, 1955, 4952b relied on.

DONALD G. DAUS, Primary Examiner

A. M. T. TIGHE, Assistant Examiner